United States Patent
Pang et al.

(10) Patent No.: US 12,245,204 B2
(45) Date of Patent: Mar. 4, 2025

(54) METHOD FOR ALLOCATING RESOURCES IN A WIRELESS COMMUNICATION SYSTEM

(71) Applicant: Hitachi Energy Ltd, Zürich (CH)

(72) Inventors: Zhibo Pang, Vasteras (SE); Michele Luvisotto, Vasteras (SE); Roger Jansson, Vasteras (SE)

(73) Assignee: HITACHI ENERGY LTD, Zurich (CH)

(*) Notice: Subject to any disclaimer, the term of this patent is extended or adjusted under 35 U.S.C. 154(b) by 558 days.

(21) Appl. No.: 17/429,564

(22) PCT Filed: Feb. 13, 2020

(86) PCT No.: PCT/EP2020/053684
§ 371 (c)(1),
(2) Date: Aug. 9, 2021

(87) PCT Pub. No.: WO2020/169434
PCT Pub. Date: Aug. 27, 2020

(65) Prior Publication Data
US 2022/0110113 A1    Apr. 7, 2022

(30) Foreign Application Priority Data
Feb. 20, 2019  (EP) .................................. 19158242

(51) Int. Cl.
*H04W 72/0446*  (2023.01)
*H04W 28/06*  (2009.01)

(52) U.S. Cl.
CPC ....... *H04W 72/0446* (2013.01); *H04W 28/06* (2013.01)

(58) Field of Classification Search
None
See application file for complete search history.

(56) References Cited

U.S. PATENT DOCUMENTS

| 7,474,676 B2 | 1/2009 | Tao et al. |
| 7,492,789 B2 | 2/2009 | Shvodian |

(Continued)

FOREIGN PATENT DOCUMENTS

| CN | 1741666 A | 3/2006 |
| CN | 105898880 A | 8/2016 |

(Continued)

OTHER PUBLICATIONS

Video Coding Code Rate Control Method, Electronic Device and Storage Medium; Sun, Heng, Published May 29, 2018; English translation of CN 108093257A (Year: 2018).*

(Continued)

*Primary Examiner* — Saumit Shah
(74) *Attorney, Agent, or Firm* — Procopio, Cory, Hargreaves & Savitch LLP

(57) ABSTRACT

A method of allocating resources to at least one wireless node in a wireless communication network, comprising: continuously receiving, at a wireless node, assignment of a number of slots, wherein the slots have a fixed slot time; obtaining (S1) information regarding physical layer parameters together with said assignment of said number of slots and said slot time; extracting (S2) a packet from a packet transmission queue maintained by said wireless node; computing (S3), based on the obtained information regarding physical layer parameters, a duration of said packet; comparing (S4A, S4B, S4C) said packet duration with said slot time; performing in real time at least one of fragmentation (S5C), aggregation (S5A) and reconfiguration (S5B) of said physical layer parameters, depending on the results of said comparison step and/or an amount of packets in said packet transmission queue; and mapping (S6) said packet to a first one of the assigned slots.

11 Claims, 3 Drawing Sheets

(56) References Cited

U.S. PATENT DOCUMENTS

| | | | |
|---|---|---|---|
| 7,519,030 B2 | 4/2009 | Cimini, Jr. et al. | |
| 9,706,550 B1 * | 7/2017 | Zhou | H04W 72/0446 |
| 2002/0122413 A1 | 9/2002 | Shoemake | |
| 2004/0013102 A1 | 1/2004 | Fong et al. | |
| 2005/0053066 A1 | 3/2005 | Famolari | |
| 2006/0019677 A1 | 1/2006 | Teague et al. | |
| 2006/0187964 A1 | 8/2006 | Li et al. | |
| 2008/0049654 A1 | 2/2008 | Otal et al. | |
| 2013/0094481 A1 * | 4/2013 | Jeong | H04L 23/02 |
| | | | 370/336 |
| 2014/0079016 A1 | 3/2014 | Dai et al. | |
| 2015/0256471 A1 * | 9/2015 | Shin | H04W 4/80 |
| | | | 455/41.2 |
| 2015/0327120 A1 | 11/2015 | Liu | |
| 2017/0223571 A1 | 8/2017 | Ghosh et al. | |
| 2022/0078667 A1 * | 3/2022 | Li | H04W 28/065 |

FOREIGN PATENT DOCUMENTS

| | | | |
|---|---|---|---|
| CN | 108093257 A * | 5/2018 | |
| JP | 2014-502453 A | 1/2014 | |
| JP | 2014-522610 A | 9/2014 | |

OTHER PUBLICATIONS

International Search Report and Written Opinion for corresponding PCT Application No. PCT/EP2020/053684 dated Apr. 14, 2020, 15 pages.

* cited by examiner

METHOD FOR ALLOCATING RESOURCES IN A WIRELESS COMMUNICATION SYSTEM

TECHNICAL FIELD

The invention relates generally to wireless communication and more particularly, to wireless networking in industrial communication system.

BACKGROUND ART

In general-purpose communication networks, the linked devices typically access the shared channel in a random fashion so that they are capable of accessing the channel at any time as long as there is information to transmit. However, this involves a risk of collisions and specific mechanisms have been adopted to avoid collisions and preserve fairness, such as listen-before-talk, random back off and/or the exchange of request-to-send/clear-to-send (RTS/CTS) frames.

In specific networks, such as industrial networks, the access to the channel is typically regulated by a network manager, which assigns dedicated resources in time/frequency/code to each device that can only transmit in the assigned resource. The end nodes are hence "passive" in the sense that they can never initiate the channel access procedure autonomously.

The communication systems in industrial networks are generally used in the automation of power systems, for example sub-station automation or control of high-voltage converters. These systems have to accommodate different types of traffic, coming from informational technology (IT) infrastructure e.g. remote monitoring, metering, etc. as well as from operational technology (OT) infrastructure e.g. control systems, which vary in terms of data size and required quality of service.

In order to support the most time-critical types of traffic, communication in industrial networks is tightly synchronized and each node is assigned periodically a certain number of slots during which it can transmit data. This is even more important in wireless industrial networks, where a time-division multiple access (TDMA) mechanisms is generally adopted to ensure deterministic access to the shared channel and avoid collisions.

The communication schedule and the size of the TDMA slots assigned to each node is typically decided by a central network manager based on many aspects, such as traffic flows, measured channel quality, node capabilities, etc.

The centralized communication schedule is dynamically updated and distributed to all nodes in the network by the network manager. Each node, then, has to map the assigned slots with the packets available in its transmission queue, possibly belonging to different traffic flows with heterogeneous size and requirements.

In order to simplify the scheduling and improve synchronization, the duration of a slot and the number of slots in a periodically repeated superframe are typically fixed in industrial wireless networks. However, due to the heterogeneous nature of the traffic flows, it may often happen that the size of the slot is too short or too long with respect to the size of the data to transmit with the highest priority. In the first case, when the slot is too short, the node may need to fragment the high-priority packet in multiple sub-packets to be sent over consecutive slots. On the other hand, if the slot is too long, the node may need to aggregate multiple packets in the queues in a bigger packet, to avoid underutilizing the assigned resources.

There are existing methods that utilize fragmentation and aggregation at the data-link layer of communication networks or higher. Examples of such methods are disclosed in U.S. Pat. Nos. 7,519,030B2 and 7,474,676B2. A drawback of the methods known from these patents is their inability to couple fragmentation and aggregation with a communication schedule; they rather adopt a configurable size threshold whereby all packets are either fragmented or aggregated. For instance, in the case a slot is too long and there are no packets to aggregate, the channel will not be fully utilized.

SUMMARY OF THE INVENTION

Accordingly, in order to avoid the problems and disadvantages described above, there is a method of allocating resources to at least one wireless node in a wireless communication network. The method may be implemented in a wireless node. The method comprises the steps of receiving, in particular continuously receiving, at the wireless node, assignment of a number of slots, wherein the slots have a fixed slot time. Continuously receiving, in particular in the context of a network where transmissions occur in superframes and slots, may include recurrently receiving, repeatedly receiving, periodically receiving, receiving in a not-one-off or not ad hoc manner; in particular, continuously receiving, in the sense of the claims, is not restricted to an uninterrupted receiving activity. The method further comprises the steps of: obtaining information regarding physical layer parameters together with said assignment of said number of slots and said fixed slot time; extracting a packet from a packet transmission queue maintained by said wireless node; computing, based on the obtained information regarding physical layer parameters, a duration of said packet; comparing said packet duration with said fixed slot time; performing in real time at least one of fragmentation, aggregation and reconfiguration of said physical layer parameters, depending on the results of said comparison step and/or an amount of packets in said packet transmission queue, and mapping said packet to a first one of the assigned slots.

Here, the real time fragmentation mechanism allows distributing the transmission of long packets across different slots without interfering scheduled transmissions from other nodes. The method may also perform a real time aggregation as an alternative to fragmentation. The real-time aggregation mechanism allows reducing the communication overhead by transmitting just one physical layer (PHY) preamble for multiple packets, thus maximizing the channel utilization. In addition, by adapting the packets in size into the slots in real-time, the network may reduce delays and the node avoids underutilizing the assigned resources. The other alternative, to be selected when none of the previous mentioned alternatives can be applied, is to perform a real-time PHY reconfiguration. The real-time PHY reconfiguration may use the information about the PHY configuration from the network manager in order to adapt the packet to the slot length. This allows maximizing the reliability of the transmission while still using the assigned resources and, hence, avoiding the increase of the total latency.

The fragmentation, aggregation and reconfiguration of said physical layer parameters depend on the results of said comparison step and/or said packet transmission queue and only if said packet duration differs from said fixed slot time.

Furthermore, the real time fragmentation and aggregation of packets may be implemented at each network node at the transmitting part.

The method may further comprise sending, e.g., mapping, said packet to a first available slot, which is fixed in time and/or frequency, which may be one of the assigned slots. The step of extracting, computing, comparing and performing any of the above-mentioned actions may be repeated until all slots are assigned in the superframe.

Further, the information regarding physical layer parameters that is obtained from the network manager may be a broadcast beacon frame.

Further, the physical layer parameters may be modulation order and/or code rate and/or cyclic prefix length. The advantage of obtaining the physical layer parameters is the possibility for the transmitting node to adapt the packets in real-time e.g. altering the modulation order, the code rate and the cyclic prefix length. These alterations may increase or decrease the packet duration to match the slots.

Further, the method may be determined to perform a fragmentation of said packet when the comparison indicates that said packet duration is longer than said fixed slot time.

Further, the method may be determined to perform an aggregation of packets in said packet transmission queue when said comparison indicates that, said packet duration is shorter than said fixed slot time.

Further, the method may be determined to perform a reconfiguration of said physical layer parameters when said comparison indicates that the packet duration is shorter than said fixed slot time and no further packets are in said packet transmission queue. Alternatively or additionally, the physical layer parameters are reconfigured when the packet duration is longer than said fixed slot time.

Further, the method may be determined to perform no action before sending, e.g., mapping, said packet to said first available slot, when said packet duration is equal to said fixed slot time. In other words, there is no need to modify the packet or the configuration of the PHY, so the packet is forwarded to the superframe upon its arrival.

There is also provided a transmitting device configured to communicate with other transmitting devices and/or a network manager in a wireless communication network and capable of performing the steps of the above-described method or its described variations. A transmitting device may be an entity or a node configured transmit data packets in a network.

There is also provided a wireless network system comprising a network manager configured to continuously transmit assignments of a number of slots having a fixed slot time to each of a plurality of transmitting devices of the type described above.

BRIEF DESCRIPTION OF THE DRAWINGS

Embodiments of the invention will now be described with reference to the accompanying drawings, on which.

DETAILED DESCRIPTION

Figure 1:
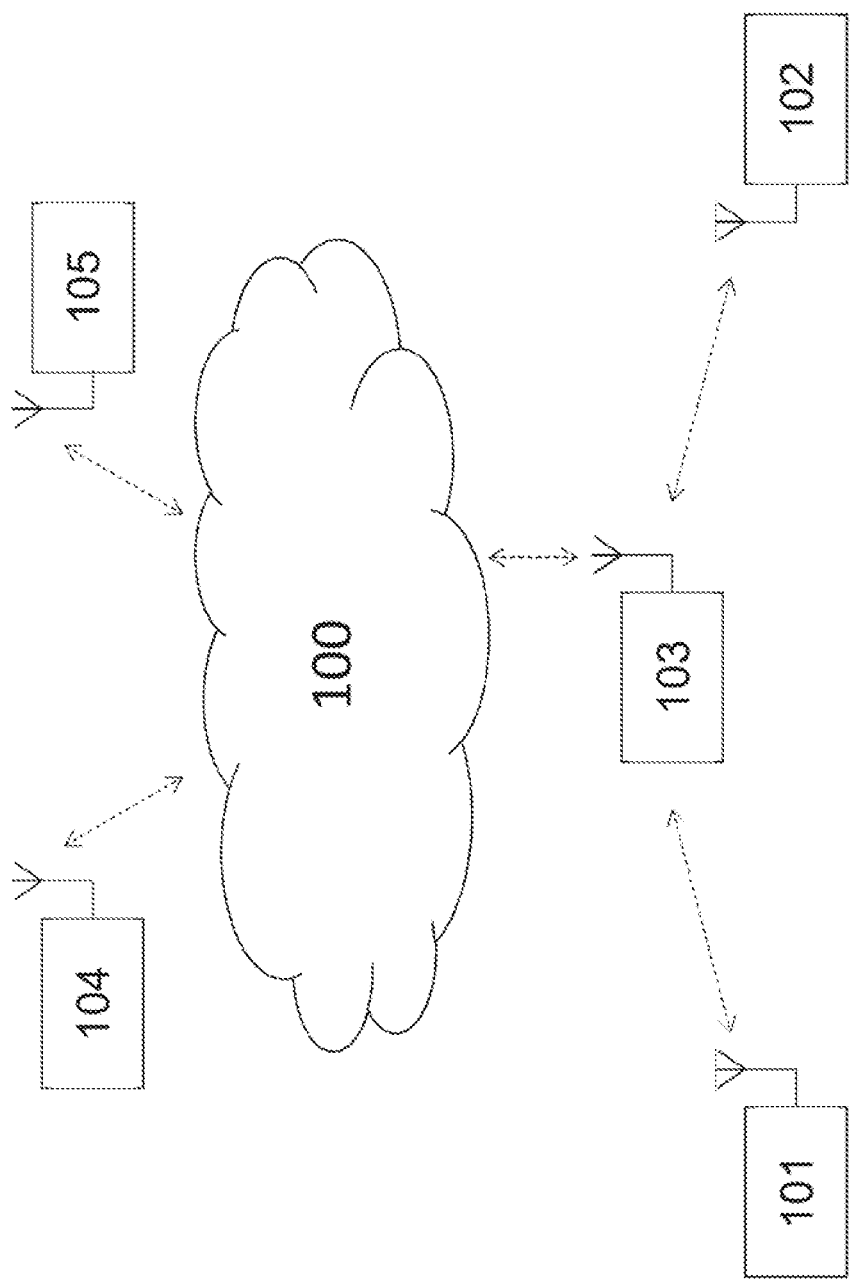
FIG. 1 shows a multi-hop configuration according to an example of a system of the present disclosure.

The proposed solution according to the present invention applies to a configuration represented in FIG. 1. The network system of allocating resources comprises a network manager 100, being in communication with a plurality of transmitting devices, which is continuously allocating resources and distributing the communication schedule.

Several transmitting devices 101, 102, 103, 104, 105 or nodes are equipped with an RF front-end, which allows them to directly communicate over a wireless network with the network manager 100, and to communicate with other transmitting devices, or nodes, in an e.g. multi-hop configuration. For instance, the nodes can represent different components of a sub-station automation system, e.g., gateways, breakers, protections etc., exchanging control messages.

In this case, the network system with time scheduling is employed. Each node 101, 102, 103, 104, 105 in the network is assigned a certain number of slots in time and frequency, e.g. within a superframe, by the network manager 100 and is capable of only transmitting within these slots. Transmissions in the network are performed in relation to consecutive superframes; resource allocation according to embodiments the present may be performed in one superframe at a time. In other words, the superframe repeats over time, which allows the network manager 100 to update the allocation of slots over time. However, the slot duration is fixed in time and frequency to simplify the scheduling and to allow easier synchronization. As the nodes 101, 102, 103, 104, 105 are continuously receiving assignment of available slots and slot time, they are also obtaining information regarding physical layer parameters. These parameters may be modulation order, code rate, and cyclic prefix length.

Figure 2:
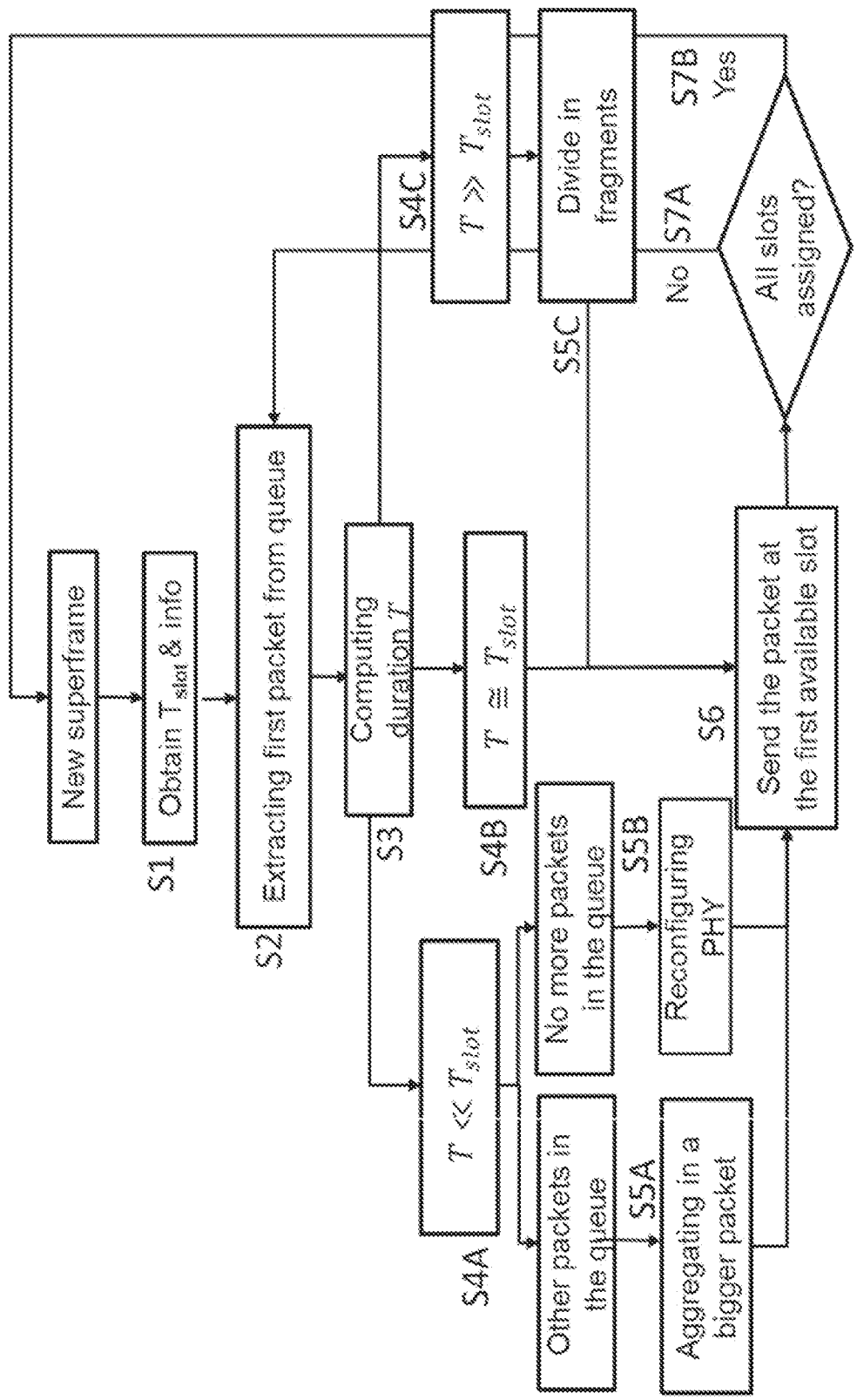
FIG. 2 shows a flowchart of the method steps according to an example of the present disclosure.

In FIG. 2, a flowchart of the method steps according to an example of the present disclosure is shown.

The method relates to the allocation of resources to at least one wireless node, which may be assisted by a network manager and which may be performed within one superframe at a time, the superframe belonging to a sequence of superframes in a wireless communication network. The network may use time scheduling, such as TDMA or other types of time scheduling. The slots are fixed in time, e.g., in the sense that they have a fixed slot time or slot duration.

At the beginning of each superframe, the wireless node receives continuously assignment of a number of slots and slot time/slot frequency by the network manager. In step S1 of this method, the at least one wireless node obtains the assignment of the number of slots and the slot time/frequency together with information regarding physical layer parameters. This extra information, which may be sent through a broadcast beacon frame, is used by the transmitting node to adapt the duration of the data packets from the transmission queue to the time-fixed slots within the superframe. In step S2, the transmitting node, which maintains the packet transmission queue, extracts a packet from the packet transmission queue in accordance to the priority requirements. The next step S3 is to compute the duration of the extracted packet. The computation may be based on the obtained information regarding physical layer parameters. In step S4, the computed packet duration is compared with the assigned slot time/frequency so as to determine action to take according to the duration of the packet in relation to the assigned slot. The different actions involve performing a fragmentation, aggregation or reconfiguration of the physical layer parameters depending on the results of the comparison step and/or said packet transmission queue and only if said packet duration differs from the slot time/frequency.

There are three outcomes:

a) Step S4A: The packer duration T is shorter than the slot time. In this case, the node checks if there are other packets in the transmission queue and determines there-after whether to take step S5A or step S5B. If there are more packets in the queue in step S5A, multiple packets can be aggregated into one. The optimal number of aggregated packets is selected so that the duration of the resulting aggregated packet does not exceed the slot time. On the other hand, if there are no other packets in the queue in step S5B, the PHY layer parameters obtained by the network manager are modified so the packet occupies the entire slot. In particular, the modulation order and the code rate can be decreased, and the cyclic prefix length can be increased, thus increasing the packet duration up to the slot time. Therefore, the reliability of the communication will increase.

b) Step S4B: The packet duration is equal or is corresponding to the slot time. In this case, no actions are taken by the node and the packet can be sent to the next step.

c) Step S4C: The packet duration is longer than the slot time. In this case, the packet is fragmented in step S5C. The optimal number of fragments is selected so that the duration of each fragment does not exceed the slot time and that the total latency satisfies the quality-of-service requirements. The total latency is here defined as the time at which the last fragment is delivered.

All the resulting packets are then mapped and sent in step S6 to the first available slot. In optional step S7A-S7B, it is ascertained whether all the slots of a superframe have been assigned, wherein in the negative case the procedure is repeated from step S2 until all available slots of the superframe have been assigned. As explained, each slot is assigned to the node in the current superframe, unless they already have been occupied, which may happen in case of fragmentation. The transmissions for the current superframe are then carried out in the assigned slots and the node will wait before starting at step S1 for the beginning of the consecutive superframe.

Figure 3:
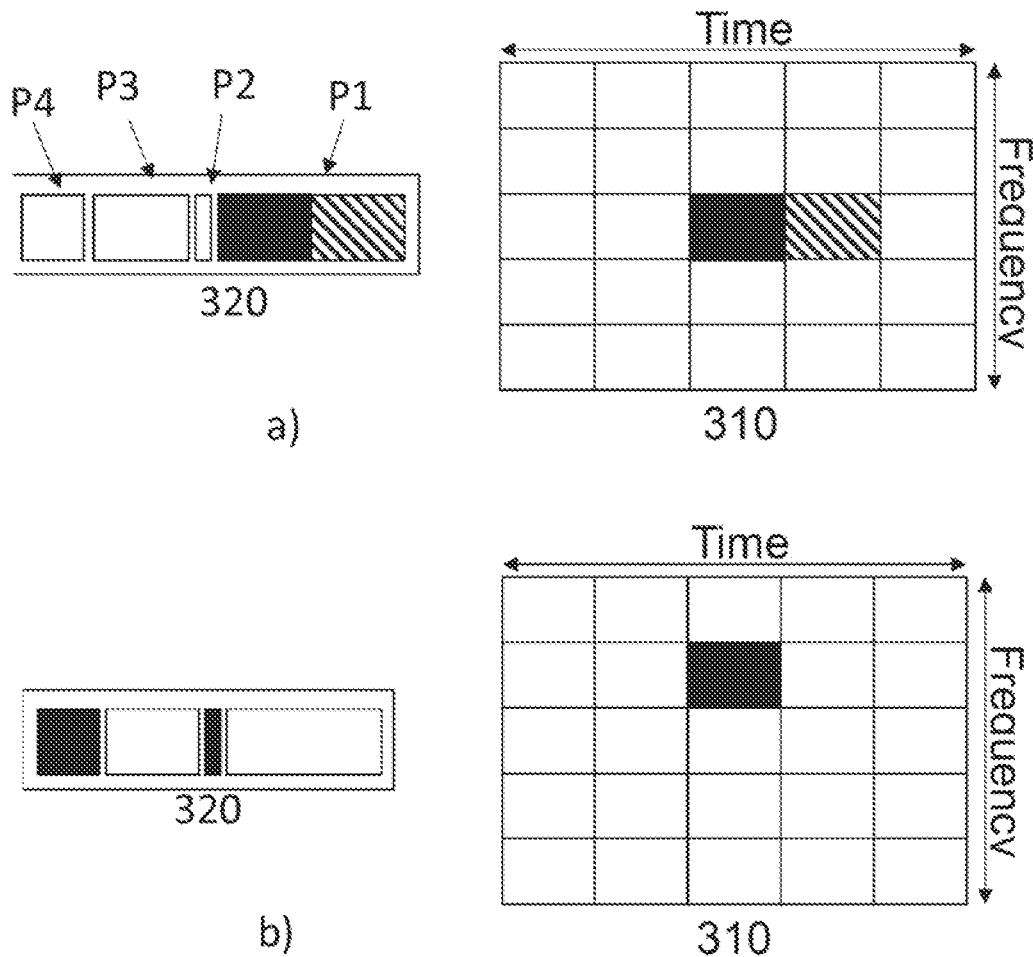
FIG. 3a shows an example of fragmentation of a packet in a superframe according to the present disclosure.
FIG. 3b shows an example of aggregation of two packets in a superframe according to the present disclosure.

As represented in FIG. 3, each transmitting node maintains a packet queue 320 with the list of the packets to send, sorted by priority. The packets P1, P2, P3, P4 belong to heterogeneous traffic flows and are hence characterized by different sizes and different quality of service requirements, e.g. worst-case latency. The number of packets in the queue of each node depends on the applications running in the node as well as on the position of the node in the network. As seen in FIG. 1, node 103 has to forward all the traffic of 101 and 102 in addition to his own traffic and, hence, will have a more crowded queue. As it can be observed in FIG. 3, the duration of the packets might not match the size of the slot. Specifically, in FIG. 3a, the packet queue 320 comprises four packets of different sizes P1, P2, P3, P4 that are to be sent to the slots, such as MAC layer slots, within the superframe 310. The slots are fixed in time and frequency and defined by the network manager. In this example, the fragmentation is performed by first comparing the size of P1 with the slot of the superframe and since the size of the packet is bigger than the slot in the superframe 310, the packet is fragmented. The fragmentation involves dividing the packet P1 into an optimal number of fragments that do not exceed the assigned slot. In this case, the fragmented packet is divided into two pieces and each piece is mapped to an available slot in the superframe 310.

In FIG. 3b, an alternative to fragmentation is used. The packet next in the queue 320 after P1, i.e. P2 is compared to the time/frequency slot. As seen, the size of the packet is too small in comparison to the time/frequency slot of the superframe 310 and should therefore be aggregated with other packets. In this case, it is possible to aggregate P1 and P4 so these packets are of the size of the slot in the superframe 310. As seen in FIG. 3b, the selected packets do not need to follow the order in the queue. The aggregated packet is then mapped to the first available slot.

Whilst the invention has been described with respect to illustrative embodiments thereof, it will be understood that various changes may be made in the transmitting device or node and means herein described without departing from the scope and the teaching of the invention. Accordingly, the described embodiments are to be considered merely exemplary and the invention or disclosure is not to be limited except as specified in the attached claims.

The invention claimed is:

1. A method of allocating resources to at least one wireless node in a wireless communication network, said method comprising the step of:
   a) continuously receiving, at a wireless node, assignment of a number of slots, wherein the slots have a fixed slot time, characterized in that the method further comprises the steps of:
   b) obtaining (S1) information regarding physical layer parameters together with said assignment of said number of slots and said slot time,
   c) extracting (S2) a packet from a packet transmission queue maintained by said wireless node,
   d) computing (S3), based on the obtained information regarding physical layer parameters, a duration of said packet,
   e) comparing (S4A, S4B, S4C) said packet duration with said fixed slot time,
   f) performing in real time at least one of fragmentation (S5C), aggregation (S5A) and reconfiguration (S5B) of said physical layer parameters, depending on the results of said comparison step and/or an amount of packets in said packet transmission queue, wherein said physical layer parameters comprise one or both of modulation order or cyclic prefix length,
   wherein in step f) it is determined to perform the reconfiguration of said physical layer parameters in response to said comparison indicating that the packet duration is shorter than said fixed slot time and no further packets are in said packet transmission queue, and/or
   wherein in step f) it is determined to perform the reconfiguration of said physical layer parameters in response to said comparison indicating that the packet duration is longer than said fixed slot time, and
   g) mapping (S6) said packet to a first slot of the assigned number of slots.

2. The method of claim 1, wherein step f) comprises reconfiguring (S5B) said physical-layer parameters.

3. The method of claim 1, wherein the received assignments relate to slots within one superframe, which is one of a number of consecutive superframes in the wireless communication network, further comprising the step of:
   h) repeating (S7A) steps c)-g) until all slots in the superframe have been assigned.

4. The method according to claim 1, wherein said obtained information is a broadcast beacon frame.

5. The method according to claim 1, wherein said physical layer parameters further comprise code rate.

6. The method according to claim 1, wherein in step f) it is determined to perform a fragmentation of said packet when the comparison indicates that said packet duration is longer than said fixed slot time.

7. The method according to claim 1, wherein in step f) it is determined to perform an aggregation of packets in said packet transmission queue when said comparison indicates that said packet duration is shorter than said fixed slot time.

8. The method according to claim 1, wherein in step f) it is determined to perform no action before mapping said packet to said first available slot, when said packet duration is equal to said fixed slot time.

9. A transmitting device configured to communicate with other transmitting devices and/or a network manager in a wireless communication network, characterized by being configured to perform the method steps according to claim 1.

10. A wireless network system comprising a network manager (100) configured to continuously transmit assignments of a number of slots having a fixed slot time to each of a plurality of transmitting devices (101, 102, 103, 104, 105), and characterized in that at least some of said transmitting devices are configured to perform the method steps of claim 1.

11. A wireless network system comprising a network manager (100) according to claim 10 and a plurality of transmitting devices (101, 102, 103, 104, 105) configured to communicate with other transmitting devices and/or a network manager in a wireless communication network.

\* \* \* \* \*